US006338064B1

(12) United States Patent
Ault et al.

(10) Patent No.: US 6,338,064 B1
(45) Date of Patent: Jan. 8, 2002

(54) METHOD FOR ENABLING A WEB SERVER RUNNING A "CLOSED" NATIVE OPERATING SYSTEM TO IMPERSONATE A USER OF A WEB CLIENT TO OBTAIN A PROTECTED FILE

(75) Inventors: Michael Bradford Ault; Garry L. Child, both of Austin; Ernst Robert Plassmann, Pflugerville; Bruce Arland Rich, Round Rock; Theodore Jack London Shrader; Davis Kent Soper, both of Cedar Park, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/078,931

(22) Filed: May 14, 1998

(51) Int. Cl.[7] .............................................. G06F 17/30
(52) U.S. Cl. ................................. 707/9; 707/7; 707/10
(58) Field of Search ................................ 713/201, 202, 713/164, 168; 709/229, 304, 404, 225, 300; 380/277; 707/10, 9, 7

(56) References Cited

U.S. PATENT DOCUMENTS

| 5,187,790 A | | 2/1993 | East et al. ................... 709/304 |
| 5,421,011 A | | 5/1995 | Camillone et al. ........... 709/104 |
| 5,560,008 A | * | 9/1996 | Johnson et al. .............. 709/300 |
| 5,623,601 A | | 4/1997 | Vu .............................. 713/201 |
| 5,682,478 A | | 10/1997 | Watson et al. ............... 709/229 |
| 5,684,951 A | | 11/1997 | Goldman et al. ........... 713/202 |
| 5,708,780 A | | 1/1998 | Levergood et al. ......... 709/229 |
| 5,748,890 A | * | 5/1998 | Goldberg et al. ............ 713/202 |
| 5,918,228 A | * | 6/1999 | Rich et al. .................... 707/10 |
| 5,948,064 A | * | 9/1999 | Bertram et al. .............. 709/225 |

FOREIGN PATENT DOCUMENTS

WO 9714098 4/1997

OTHER PUBLICATIONS

Schultz, IBM Technical Disclosure Bulletin, "Personal Net Machine," 3/97, vol. 40, No. 3, pp. 215–216.
Rodriguez, IBM Technical Disclosure Bulletin, "Passport File for Secure Access to the Internet," 2/96, vol. 39, No. 2, pp. 333–334.
Burger, IBM Technical Disclosure Bulletin, "Session–Based Secure Communication for Secure Xenix," 2/90, No. 9a, pp. 239–243.
Lenharth et al., IBM Technical Disclosure Bulletin, "Warp Server (SMB) Authentication from a Window NT Client," 10/97, Vo. 40, No. 10, pp. 99–10 and 185–186.

* cited by examiner

*Primary Examiner*—Wayne Amsbury
*Assistant Examiner*—Thuy Pardo
(74) *Attorney, Agent, or Firm*—Jeffrey S. LaBaw; Joseph R. Burwell; David Judson

(57) ABSTRACT

A method of authenticating a Web client to a Web server connectable to a distributed file system of a distributed computing environment. The distributed computing environment includes a security service for returning a credential to a user authenticated to access the distributed file system. The method preferably operates within the context of a native operating system environment such as "Windows NT". Upon initialization of the Web server, a session manager creates a pool of temporary Windows NT user identities. In response to a Web client browser request, a temporary NT user identity is associated with proper DCE credentials. A server process then impersonates the returned NT user identity on a thread which is attempting to access the requested resource.

35 Claims, 4 Drawing Sheets

METHOD FOR ENABLING A WEB SERVER RUNNING A "CLOSED" NATIVE OPERATING SYSTEM TO IMPERSONATE A USER OF A WEB CLIENT TO OBTAIN A PROTECTED FILE

BACKGROUND OF THE INVENTION

1. Technical Field

The present invention relates generally to Web transaction processing and more particularly to enabling access to protected files (e.g., Web documents) stored in a secure distributed file system.

2. Description of the Related Art

The World Wide Web of the Internet is the most successful distributed application in the history of computing. In the Web environment, client machines effect transactions to Web servers using the Hypertext Transfer Protocol (HTTP), which is a known application protocol providing users access to files (e.g., text, graphics, images, sound, video, etc.) via a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Explorer) at a client machine involves specification of a link via the URL. In response, the client makes a request to the server identified in the link and receives in return a document formatted, for example, according to HTML.

Many business organizations and other entities now desire to integrate Web transaction processing into their distributed computing environment in which users access distributed resources and process applications. A known distributed computing environment, called DCE, has been implemented using "open" software conforming to standards implemented from time-to-time by the Open Group (f/k/a the Open Systems Foundation (OSF)). As DCE environments become more popular, many applications may be utilized to provide distributed services such as data sharing, printing services and database access. Open Group DCE includes a distributed file system, called Distributed File Services (DFS), for use in these environments.

DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace. Multiple servers can export their file system to this namespace. All DFS users, in the meantime, share this namespace, making all DFS files readily available from any DFS client machine.

It would be highly desirable to extend the functionality of existing standalone Web servers in the enterprise environment to take advantage of the scalability, file availability and security features of DFS (or other similar distributed file systems). As a by-product, users with an off-the-shelf browser would be able to easily access the Web information stored in the DFS namespace with no additional software on the client machine.

This goal, however, cannot be readily achieved, especially with respect to client-server based systems running a "closed" native operating system such as Microsoft Windows NT. Because of the "closed" nature of Windows NT, a user of a client machine running this operating system may only log on against an account held at the machine, at a server running the Windows NT operating system, or at any other servers that are "trusted" by the NT server that the client is configured against. Only these options are supplied to the user during the logon process, and there are no practical interfaces to allow user authentication from non-native server domains. This closed architecture eliminates the ability of the Web server to impersonate a user of Windows NT client machine to access a protected DFS file or resource.

A method of obtaining a DCE credential and making that credential available to a Netscape server process prior to accessing a file within a DFS filespace has been described in U.S. Pat. No. 5,918,228 to Rich et al. That application is entitled "Method And Apparatus For Enabling A Web Server To Impersonate A User Of A Distributed File System To Obtain Secure Access To Supported Web Documents" and is assigned to the assignee of this application. The method described in this patent, however, does not work when the server process is supported on a Windows NT platform.

This invention addresses and solves that problem.

BRIEF SUMMARY OF THE INVENTION

A specific object of this invention is to provide a "Windows NT" method for enabling a Web server to impersonate a user of a Web client machine to obtain access to a file protected within a secure distributed file system.

Another object of this invention is to respond to a Web client browser request by setting up a temporary NT user identity with proper DCE credentials and then impersonating that NT user identity on a Web server thread which is attempting to access the requested resource.

A more general object of this invention is to authenticate native operating system (e.g., Windows NT) users accessing a distributed file system through an Internet World Wide Web server.

It is a further general object of this invention to provide a authentication scheme to facilitate secure Web document access from a distributed file system.

It is yet another object of the invention to implement a Windows NT operating system-based authentication scheme for Web server applications to enable the Web server to impersonate a Web client browser user to a secure file system.

It is another objective of the invention to integrate a security mechanism provided by a Web Server with conventional DFS security. This enables the functionality of existing standalone Web servers to be enhanced in the enterprise environment to take advantage of the scalability, file availability and security features of DFS (or other similar distributed file systems). As a by-product, users with an off-the-shelf browser are able to easily access the Web information stored in the DFS namespace, typically with no additional software on the client machine.

The invention preferably is implemented in a plug-in or other application executed by the Web server. The plug-in component has associated therewith a session manager control process and a session manager process, each of which preferably are created by the server plug-in component when the Web server initializes. During its initialization, the session manager control process calls Windows NT APIs to create a pool of temporary NT user identities (and their NT logon passwords) for use by the session manager process. When a browser user attempts to access a DFS file from a Windows NT system running the Web server and the server plug-in, the plug-in component prompts the browser user for a DCE user id and password. When the plug-in component receives this input, it invokes the session manager process in an attempt to acquire the credentials of that DCE user. In particular, the session manager process obtains an unused NT user identity from the pool and marks it as "in use". It then invokes DCE security API's necessary to perform a "programmatic" dce_ login. These API's create a DCE credential file for the DCE user and return the path specification of the file.

When the server thread then invokes the DFS file system to access the DFS file requested by the browser user, the Windows NT registry is interrogated to learn whether the NT user identity of this thread has any associated DCE credentials. Access to the DFS file is granted or denied accordingly. When the server thread again returns to the plug-in (after returning the requested file), the plug-in code calls a session manager API to "release" the NT user identity that had been used to service the browser request. Returning the NT user identity back to the "pool" makes the identity available for the processing of future requests.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
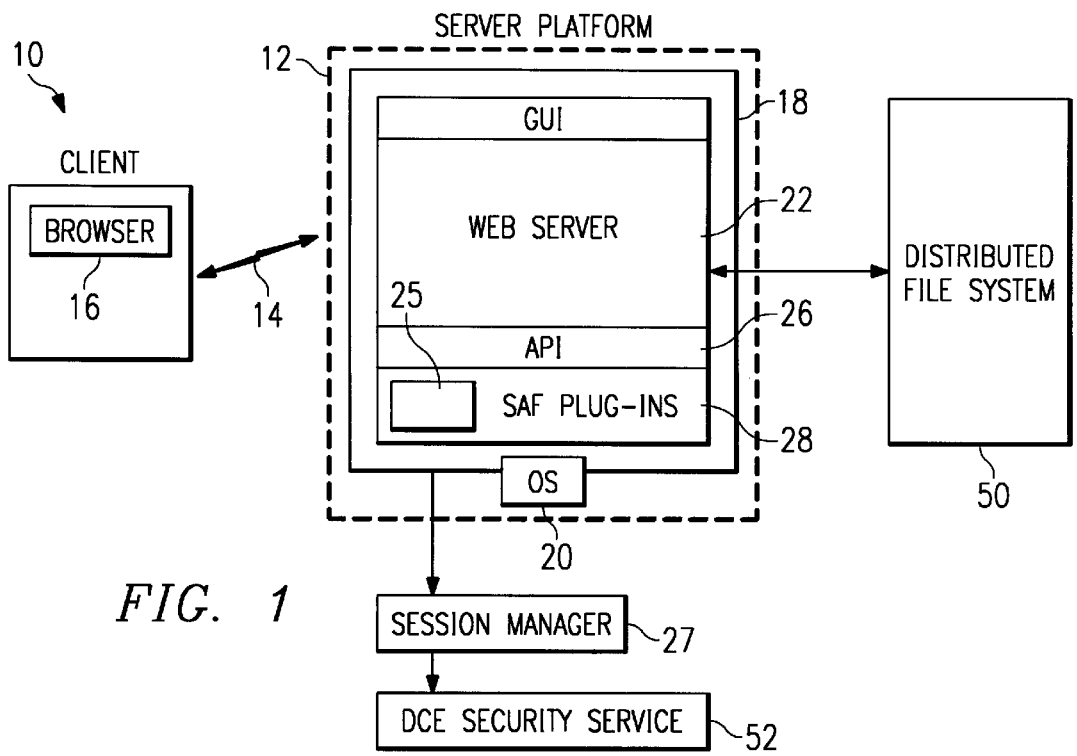
FIG. 1 is a representative system in which the plug-in of the present invention is implemented.

A representative system in which the present invention is implemented is illustrated in FIG. 1. A client machine 10 is connected to a Web server platform 12 via a communication channel 14. For illustrative purposes, channel 14 is the Internet, an intranet or other known connection. In the case of the Internet, Web server platform 12 is one of a plurality of servers which are accessible by clients, one of which is illustrated by machine 10. A client machine includes a browser 16, which is a known software tool used to access the servers of the network. By way of example only, a client machine is a personal computer. Representative browsers include, among others, Netscape Navigator (all versions), Microsoft Internet Explorer (all versions) or the like, each of which are "off-the-shelf" or downloadable software programs. The Web server platform supports files in the form of hypertext documents and objects. A set of related documents is sometimes referred to as a "Web" site. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an Intel processor-based computer 18 running the Microsoft Windows NT operating system Version 4.0 20 and a Web server program 22, such as Netscape Enterprise Version 2.x (or higher), that supports interface extensions. The platform 12 also includes a graphical user interface (GUI) 24 for management and administration. While the above platform is useful, any other suitable hardware/operating system/web server combinations may be used.

Figure 2:
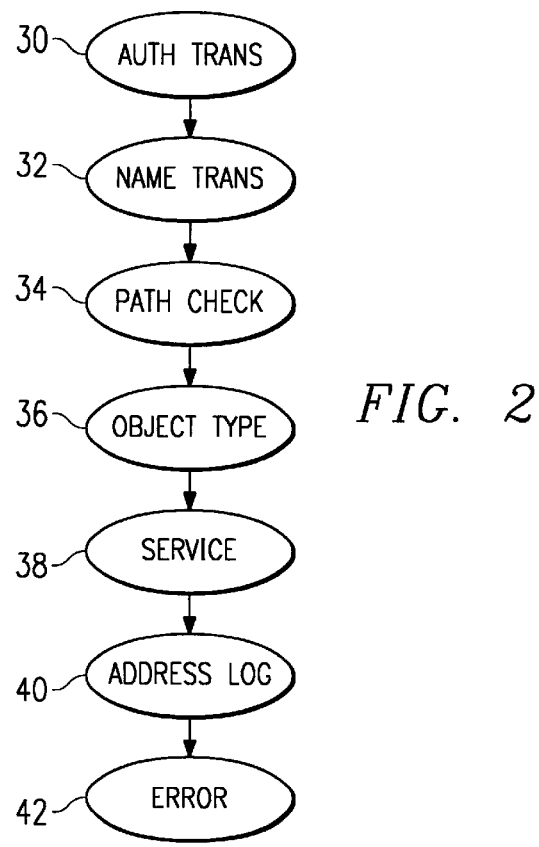
FIG. 2 is a flowchart of server side operations of a conventional Web transaction in response to receipt of a request from a browser of a client machine.

The Web server accepts a client request and returns a response. The operation of the server 18 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client via a normal server-service routine. The particular function selected depends on the nature of the request. At step 40, called Add Log (AddLog), information about the transaction is recorded. At step 42, called Error, the server responds to the client when it encounters an error.

Thus, the Web server 18 includes a known set of server application functions (SAFs). These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins." The present invention makes use of the server API 26 to provide for a plug-in that facilitates user authentication so that users of client machines may use browsers to enable Web access to documents on a distributed file system 50.

In particular, according to a general object of the present invention, it is desired to enable the user of the client machine 10 (intentionally or otherwise) to use the (preferably) off-the-shelf browser 16 to access, browse and retrieve documents located in the distributed file system 50. One such file system 50 is Distributed File Services (DFS), which is a known distributed file system implemented in a networked environment called the Distributed Computing Environment (DCE). DCE has been implemented using software available from the Open Group (f/k/a Open Systems Foundation (OSF)). In a distributed computing environment, a group of machines is typically referred to as a "domain." An Open Group DCE domain is called a "cell." A DCE cell may be a complex environment involving hundreds of machines in many locations.

DCE DFS 50 provides data sharing services by making use of remote procedure calls (RPC's) for naming, and a DCE Security Service 52 for authentication services. DFS 50 interfaces to the DCE Security Service 52 via the session manager process 27, as described in more detail in copending application Ser. No. 08/790,042, assigned to the assignee of this invention. In addition to its use of DCE Services, DFS itself is rich in features. It provides a uniform global filespace which allows all DFS client users to see the same view of the filespace, and it caches filesystem data at the client for improved scalability and performance by reducing network traffic to file servers. DFS also supports advisory file locking, and one of its features is the ability to export the operating system's native filesystem.

Figure 3:
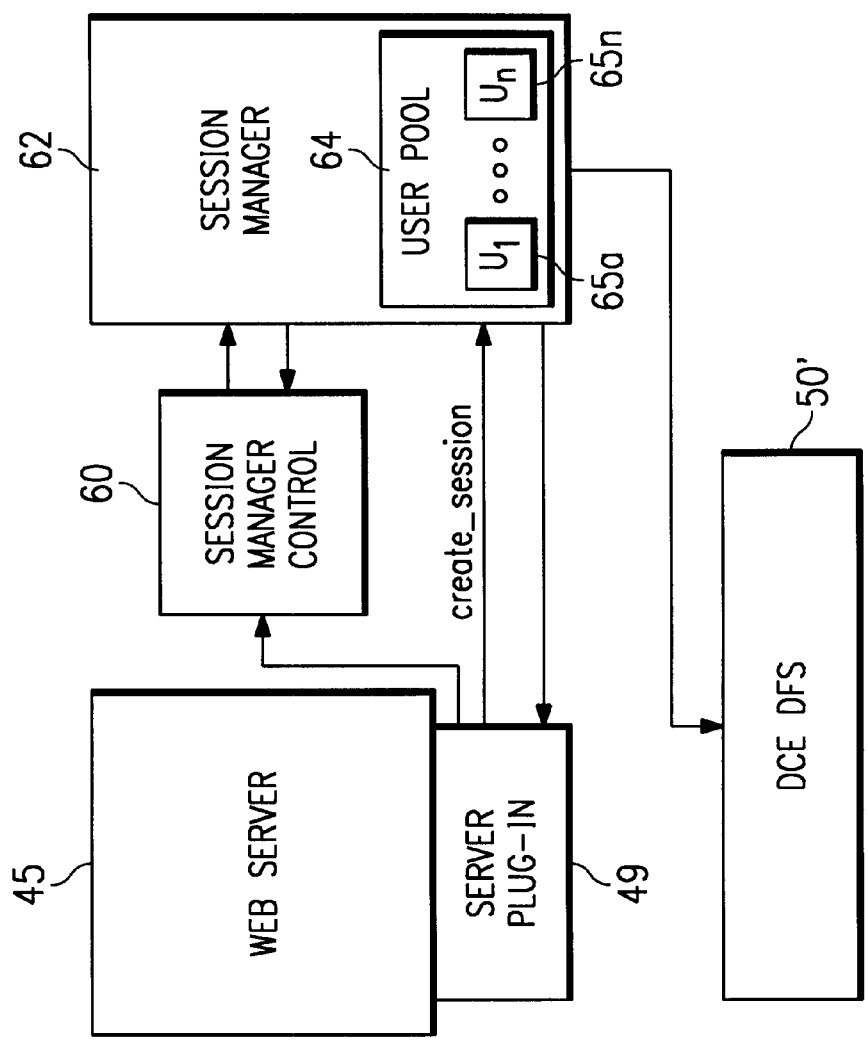
FIG. 3 is a block diagram illustrating the server plug-in and its associated processes that comprise a preferred embodiment of the present invention.

A preferred embodiment of the present invention is now described and illustrated in FIG. 3. In this illustrative system, client 41 having a Web browser program 43 connects to a server platform 45 over a network 47 such as the Internet, an intranet or the like. Client and server, in this example, run the Microsoft Windows NT operating system or some other such closed system such as, Windows 95 or the like. Server platform 45 supports a Web server program such as the Netscape Enterprise Server Version 2.x or higher. A Web server component 49 (which is preferably a plug-in, but may be a separate application, a servlet or otherwise integrated with the server) is associated with and run by the Web server 45 for performing various security and other functions to facilitate secure access to secure or protected resources. Such resources, for purposes of illustration, reside in the distributed computing environment (DCE) cell, which is represented by block 50' in the figure. As noted above, DCE 50' may include, for example, a distributed file service such as Open Group Distributed File Services (DFS). Other secure file services may be provided as well. As noted above, DFS provides for secure access to Web-based documents and other files.

The system also includes a session manager control process 60 and a session manager process 62, each of which preferably are created by the server plug-in component 49 when the Web server 45 initializes. During its initialization, the session manager control process 60 calls Windows NT APIs to create a pool 64 of temporary NT user identities 65a ... n (and their NT logon passwords) for use by the session manager process 62. This NT user pool may be a simple table that is maintained within a memory-mapped file shared between the two processes. Any other convenient data structures may be used to represent the temporary NT user pool.

As is well known, because of the "closed" nature of the Windows NT operating system, a user of the client machine 41 may only log on against an account held at the machine, at a server (such as server 45) running the Windows NT operating system, or at any other servers that are "trusted" by the NT server that the client is configured against. Only these options are supplied to the user during the logon process, and user authentication from non-native server domains is impractical. Moreover, in known Windows NT systems, a NT user account is required for logon and subsequent user actions. Thus, the NT user account required for initial authentication may exist only on an NT client or in an NT server domain. This closed architecture eliminates the ability to access protected resources within the DCE cell 50'.

Figure 4:
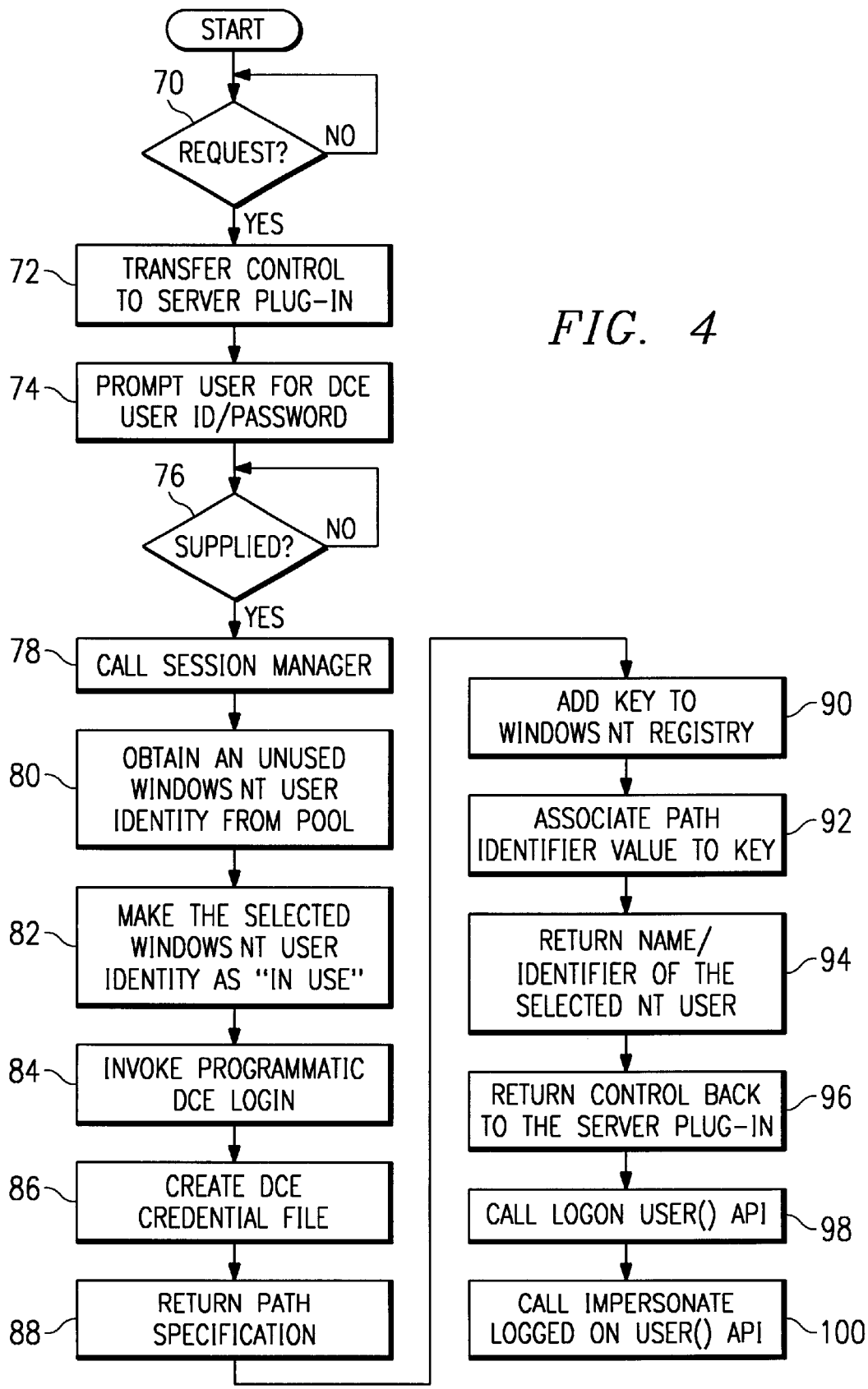
FIG. 4 is a process flow diagram illustrating the server plug-in operations during a Web transaction implemented according to the teachings of the present invention.

The present invention overcomes this limitation by setting up a temporary Windows NT user identity with proper DCE credentials and then impersonating that temporary NT user on a server thread attempting to access the protected resource. A preferred operation is illustrated in the flowchart of FIG. 4. For purposes of the following discussion, it is assumed that the server plug-in component 49 was started (e.g., when the Web server 45 initializes) and that, during its initialization, the session manager control process 60 has called the appropriate Windows NT APIs to create the pool 64 of temporary Windows NT user identities (and their NT logon passwords) for use by the session manager process 62 as has been described. It is also assumed that the Web server has a plurality of threads for servicing requests received from client machines. An instance of the plug-in component 49 executes under each such server thread.

The routine then begins at step 70 by testing whether a browser-initiated request for a protected resource (e.g., a DFS file or other object) has been received. If not, the routine cycles. If, however, the outcome of the test at step 70 is positive, the routine continues at step 72. At this point, the server plug-in component 49 receives control on a server thread that has been dispatched to service the browser-initiated request for the resource. At step 74, the routine prompts the browser user for his or her DCE userid and password. This is preferably done using a basic authentication protocol. At step 76, a test is made to determine whether the DCE userid and password have been supplied. If not, the routine cycles. If, however, the outcome of the test at step 76 indicates that the DCE userid and password have been supplied by the browser user, the routine continues at step 78.

At this point, the server plug-in component 49 calls the session manager 62, e.g., through a create_session ( ) remote procedure call (RPC). The following processing then takes place. At step 80, the routine obtains an unused Windows NT user identity from the temporary Windows NT user pool 64 which has previously created during initialization. At step 82, the routine marks the selected unused Windows NT user identity as "in use" so that the identity cannot be used by another server thread. At step 84, the routine uses the DCE userid and password entered (by the user) at step 74 to invoke DCE security APIs to perform an automatic or so-called "programmatic" login. This is a known dce_login function. At step 86, these APIs create a DCE "credential file" for the DCE user. At step 88, a path specification of the DCE credential file is returned to the session manager process 62.

Figures 5, 6:
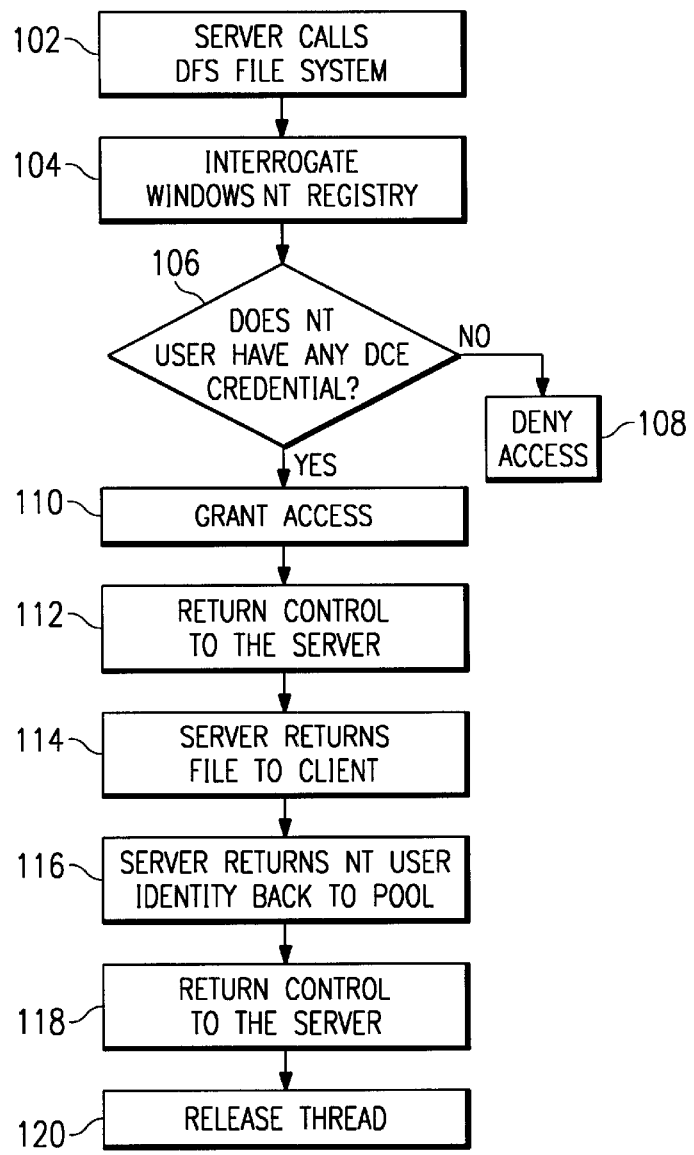
FIG. 5 is a flowchart showing the server process flow to retrieve the protected file.
FIG. 6 is a simplified representation of a Windows NT registry that includes an entry associating a temporary NT user identity with a DCE credential file.

The routine then continues at step 90 with the session manager process 62 adding a "key" to the Windows NT registry of the Windows NT operating system on the server platform. The key is the "name" or other "identifier" (e.g., SID, which is a Windows NT Security Identifier that uniquely identifies the NT user) of the selected temporary Windows NT user. At step 92, the routine associates a "value" (e.g., a string) representing the path specification to the DCE credential file returned to the session manager 62 at step 88. Thus, these steps make the DCE credential accessible to the DCE cell (and, DFS, in particular) and thus, generally, associates the credential with the selected temporary NT user identity. As illustrated in FIG. 6, the Windows NT registry 63 (or some other desired storage location) thus contains an entry 65 (comprising a name/identifier and value pair) that associates the selected NT user with a DCE credentials file. At step 94, the routine returns to the server plug-in 49 the name/identifier of the selected temporary NT user, together with the NT user's password. At step 96, control is then returned back to the server plug-in component 49.

At step 98, the server plug-in component 49 calls an appropriate Windows NT API (e.g., such as "LogonUser( )") passing it the temporary NT userid and password provided at step 94. In particular, this call returns a so-called "context handle" that represents the logged on temporary Windows NT user. The routine then continues at step 100 with the server plug-in component calling another Windows NT API and passing it the context handle returned at step 98. The "ImpersonateLoggedOnUser( )" API may be used for this purpose. This step enables the Netscape server thread, under which the plug-in component 49 is running, to assume the identity of the temporary Windows NT user. Thus, at this point in the control flow, the Windows NT registry contains an entry that associates the selected Windows NT user with a DCE credentials file, and the Netscape server thread which is servicing the browser request has assumed the identity of that NT user.

The remainder of the service request is processed as illustrated in the flowchart of FIG. 5. In this operation, the server invokes the Windows NT file system to access the DFS file (i.e. the protected resource) requested by the browser user. The routine begins at step 102 with the server calling the DFS file system through the Windows NT file system . At step 104, the DFS interrogates the Windows NT registry, preferably via a Windows NT registry API (and using the path specification). A test is then run at step 106 to determine whether the NT user identity of the particular thread has any associated DCE credentials. If not, access is denied at step 108. If, however, the NT user identity of this thread has any associated DCE credential, access is granted at step 110. At step 112, control is then returned from the NT file system to the server.

At step 114, the server platform returns the requested DFS file to the browser user to complete servicing of the original request. The routine then continues with the server returning the NT user identity back to the session manager pool 64. In particular, at step 116, the server makes a release_user( ) RPC to the session manager process 62. This step returns the NT user identity to the NT user pool by marking its table entry as "not in use" or the like. Control is then returned to the server at step 118. At step 120, the thread is released to the server, and the process ends.

Thus, according to the invention, the server plug-in sets up a temporary Windows NT user identity with the proper DCE credentials and then impersonates the Windows NT user identity on the server thread which attempts to access the requested resource. In particular, if the Web browser has not logged in yet, the server plug-in forces the browser to request the Web browser's userid and password. The Web browser user then enters a DCE user identity and password. The server plug-in then requests DCE credentials from the session manager process via a create_session API call, passing the Web browser's userid and password. The session manager selects an unused Windows NT userid from its pool of NT user identities which the session manager control process created upon initialization. The session manager attempts to log onto DCE with the user identity and password provided by the Web browser user. If the logon is successful and DCE credentials returned, the session manager uses the Windows NT registry (or some other switchable storage) to associate the selected Windows NT user with the information required to access the returned credentials. This allow that NT user to run with those DCE credentials. The session manager then returns the temporary user identity and password back to the server plug-in. The server plug-in stores the user identity and password of the selected NT user into variables which are accessible, e.g., by Common Gateway Interface (CGI) programs.

When a DCE user performs a dce_login at a command line, known DCE products (e.g. those sourced by Digital Equipment Corporation and Gradient Corporation) add a value to the Windows NT registry which associates a DCE credentials file (created by the dce_login command) with the NT user identity that is currently logged onto the Windows NT system. In the DCE system provided by Digital Equipment Corporation, this function is done by creating a registry key in a particular location which contains the "name" of the NT user logged on, and by creating a value beneath that key, which contains the path to the associated DCE credentials file. In the DCE system provided by Gradient Corporation, the function is similar except the key contains an SID instead of the NT user name. The inventive plug-in operates by assuming the NT user identity that has been set up for the process, and thus make use of such information in the above-described Windows NT implementation.

One of ordinary skill will appreciate that the present invention is not limited to use with Windows NT operating system. Indeed, the inventive principles are applicable in any client-server environment wherein the Web client and Web server have a closed native operating system and it is desired to provide secure access to a protected resource in a distributed file service connectable to the Web server.

As used herein, "Web" client should be broadly construed to mean any computer or component thereof directly or indirectly connected or connectable in any known or later-developed manner to a computer network, such as the Internet. The term "Web" server should also be broadly construed to mean a computer, computer platform, an adjunct to a computer or platform, or any component thereof.

One of the preferred implementations of the server plug-in component and the associated processes of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Thus, for example, while the present invention is preferably implemented to allow off-the-shelf browsers to access Web documents stored in DFS, the principles of the invention are equally applicable with other known architectures such as AFS (from which DFS was derived), as well as the Network File System (NFS) developed by Sun Microsystems. Moreover, implementation in Open Group DCE is not a requirement of the present invention either.

Having thus described our invention, what we claim as new and desire to secure by letters patent is set forth in the following claims:

What is claimed is:

1. A method of enabling a server supporting a closed native operating system to impersonate a user of a client to obtain a resource located in a file system of a distributed computer environment, the distributed computer environment including a security service for returning a credential to a user authenticated to access the distributed file system, comprising the steps of:

in response to a request from the user to access the resource, obtaining a credential from the security service;

associating the credential to a temporary operating system user identifier selected from a pool of such identifiers; and having the server use the temporary operating system user identifier to assume the user's identity to service the request.

2. The method as described in claim 1 wherein the step of associating the credential to a temporary operating system user identifier includes adding a key to a registry of the operating system identifying a name of the temporary operating system user.

3. The method as described in claim 2 wherein the step of associating the credential to the temporary operating system user identifier also includes adding a value to the registry of the operating system representing a path to a file supporting the credential.

4. The method as described in claim 1 wherein the closed native operating system is Windows NT.

5. The method as described in claim 4 wherein the server is a Web server, the client includes a browser that initiates the request, the distributed file system is Open Group Distributed File Services (DFS), and the resource is a Web object.

6. The method as described in claim 1 wherein the step of obtaining the credential includes the steps of:

prompting the user to enter a userid and password associated with the distributed computing environment; and using the userid and password to obtain the credential.

7. The method as described in claim 1 further including the step of creating the pool of temporary operating system user identifiers.

8. The method as described in claim 7 wherein the associating step includes the steps of:

selecting an unused temporary operating system user identifier from the pool; and identifying the selected temporary operating system user identifier as in use.

9. The method as described in claim 8 further including the step of returning the selected temporary operating system identifier back to the pool after the request is serviced.

10. A method of enabling a Web server to impersonate a user of a client to obtain a Web document located in a distributed file system of a distributed computer environment, the client and server supporting a closed native operating system, and the distributed computer environment including a security service for returning a credential to a user authenticated to access the distributed file system, comprising the steps of:

creating a pool of temporary native operating system user identifiers;

in response to a request from the user to access the Web document, obtaining a credential from the security service;

associating the credential to a temporary native operating system user identifier selected from a pool; and having the Web server use the temporary native operating system user identifier to assume the user's identity to service the request.

11. The method as described in claim 10 wherein the step of associating the credential to a temporary native operating system user identifier includes the steps of:

adding a key to a registry of the native operating system identifying a name of the temporary native operating system user; and adding a value to the registry representing a path to a file supporting the credential.

12. The method as described in claim 11 wherein the closed native operating system is Windows NT.

13. The method as described in claim 12 wherein the distributed file system is Open Group Distributed File Services (DFS).

14. The method as described in claim 10 wherein the step of obtaining the credential includes the steps of:

prompting the user to enter a userid and password associated with the distributed computing environment; and performing a programmatic login to the security service using the userid and password to obtain the credential.

15. The method as described in claim 10 wherein the associating step includes the steps of:

selecting an unused temporary native operating system user identifier from the pool; and identifying the selected temporary native operating system user identifier as in use.

16. The method as described in claim 15 further including the step of returning the selected temporary native operating system user identifier back to the pool after the request is serviced.

17. A method of enabling a Web server supporting a closed native operating system to impersonate a user of client to obtain a Web document located in a distributed file system of a distributed computer environment, the distributed computer environment including a security service for returning a credential to a user authenticated to access the distributed file system, comprising the steps of:

in response to a request from the user to access the Web document, setting up a temporary user identity with a credential; and having the Web server use the temporary user identity to assume the user's identity to service the request.

18. The method as described in claim 17 wherein the step of setting up the temporary user identity with a credential includes the steps of:

prompting the user to enter a userid and password associated with the distributed computing environment;

performing a login to the security service using the userid and password to obtain the credential;

selecting an unused user identity from a pool of temporary user identities;

identifying the selected user identity as in use;

adding a key to a registry which identifies the temporary user identity; and adding a value to the registry specifying a path to a file supporting the credential.

19. The method as described in claim 18 further including the step of returning the selected user identity back to the pool after the request is serviced.

20. A method of impersonating a user identity, comprising the steps of:

creating a pool of userids for a first operating system for use by a managing process;

selecting a userid from the pool and marking the userid as in use;

creating a credential file for a first process;

adding the selected userid to a registry of userids for the first operating system;

associating the selected userid to the credential file; and using the selected userid and the credential file to impersonate a user identity in the first operating system.

21. A computer program product in a computer readable medium for use in obtaining a protected file in a computer network having a client and a server each of which support a closed native operating system, the server connectable to a file system of a distributed computing environment including a security service for returning a credential to a user authenticated to access the distributed file system, the computer program product comprising:

means, responsive to a service request from a user of a process on the client, for associating a temporary closed native operating system user identity with a credential returned from the security service; and means for controlling the server to use the temporary closed native operating system user identity to assume the user's identity to service the request.

22. The computer program product as described in claim 21 wherein the closed native operating system is Windows NT.

23. The computer program product as described in claim 21 further including means for creating a pool of temporary native operating system user identities.

24. The computer program product as described in claim 23 further including means for selecting a temporary native operating system user identity and for limiting its use by another server thread during servicing of the request.

25. The computer program product as described in claim 21 further including means for prompting the user to enter a userid and password required by the distributed computing environment security service.

26. The computer program product as described in claim 21 wherein the associating means includes means for adding an entry to a registry of the native operating system.

27. The computer program product as described in claim 26 wherein the entry includes information identifying the temporary native operating system user identity and a path specifying a location of the credential.

28. A computer program product for enabling a Web server supporting a closed native operating system to impersonate a user of a client to obtain a Web document located in a distributed file system of a distributed computer environment, the distributed computer environment including a security service for returning a credential to a user authenticated to access the distributed file system, the computer program product comprising:

means for creating a pool of temporary user identities;

means responsive to a request from a user of a browser of the Web client for prompting the user to enter a userid and password associated with the distributed computing environment;

means for performing a login to the security service using the userid and password to obtain a credential;

means for selecting an unused user identity from the pool of temporary user identities;

means for identifying the selected user identity as in use;

means for adding a key to a registry identifying the temporary user identity; and means for adding a value to the registry specifying a path to a file supporting the credential; and means for returning the selected user identity back to the pool after the request is serviced.

29. A computer connectable to a distributed computing environment including a security service for returning a credential to a user authenticated to access the distributed file system, comprising:

a processor;

a closed native operating system;

a Web server program for providing World Wide Web information retrieval to Web clients connectable to the Web server program via a computer network;

a server plug-in for authenticating Web clients to the Web server program, comprising:

means, responsive to a service request from a user of a browser on the Web client, for associating a temporary native operating system user identity with a credential returned from the security service; and means for controlling the Web server to use the temporary native operating system user identity to assume the user's identity to service the request.

30. The computer as described in claim 21 wherein the closed native operating system is Windows NT.

31. The computer as described in claim 21 wherein the server plug-in further includes means for creating a pool of temporary native operating system user identities.

32. The computer as described in claim 31 wherein the server plug-in further includes means for selecting a temporary native operating system user identity and for limiting its use by another Web server thread during servicing of the request.

33. The computer as described in claim 29 wherein the server plug-in further includes means for prompting the user to enter a userid and password required by the distributed computing environment security service.

34. The computer as described in claim 29 wherein the associating means includes means for adding an entry to a registry of the closed native operating system.

35. The computer as described in claim 34 wherein the entry includes information identifying the temporary native operating system user identity and a path specifying a location of the credential.

* * * * *